United States Patent
Ferrier et al.

(10) Patent No.: US 12,378,930 B2
(45) Date of Patent: Aug. 5, 2025

(54) THRUST REVERSER COMPRISING MOVABLE CASCADES AND A SEALING MEMBRANE

(71) Applicant: SAFRAN NACELLES, Gonfreville-l'Orcher (FR)

(72) Inventors: Gina Ferrier, Moissy-Cramayel (FR); Patrick Gonidec, Moissy-Cramayel (FR); Loïc Chapelain; Edouard Marie Gabriel Ramstein, Moissy-Cramayel (FR); Patrick André Boileau, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/726,923

(22) PCT Filed: Jan. 6, 2023

(86) PCT No.: PCT/FR2023/050015
§ 371 (c)(1),
(2) Date: Jul. 5, 2024

(87) PCT Pub. No.: WO2023/131762
PCT Pub. Date: Jul. 13, 2023

(65) Prior Publication Data
US 2025/0109723 A1    Apr. 3, 2025

(30) Foreign Application Priority Data

Jan. 10, 2022 (FR) .................. 2200135

(51) Int. Cl.
*F02K 1/72* (2006.01)
*F02K 1/60* (2006.01)
*F02K 1/62* (2006.01)

(52) U.S. Cl.
CPC ............... *F02K 1/72* (2013.01); *F02K 1/605* (2013.01); *F02K 1/625* (2013.01); *F05D 2240/129* (2013.01)

(58) Field of Classification Search
CPC . F02K 1/72; F02K 1/605; F02K 1/625; F05D 2240/129
See application file for complete search history.

(56) References Cited

U.S. PATENT DOCUMENTS

| | | | |
|---|---|---|---|
| 3,330,115 A | 7/1967 | Markowski | |
| 2014/0373506 A1* | 12/2014 | Kusel | F02K 1/72 60/226.2 |

(Continued)

FOREIGN PATENT DOCUMENTS

| | | |
|---|---|---|
| FR | 2 981 989 A1 | 5/2013 |
| FR | 2 999 239 A1 | 6/2014 |

(Continued)

OTHER PUBLICATIONS

International Search Report issued Mar. 9, 2023 in PCT/FR2023/050015 filed on Jan. 6, 2023, 2 pages.

*Primary Examiner* — Gerald L Sung
*Assistant Examiner* — Rene D Ford
(74) *Attorney, Agent, or Firm* — Oblon, McClelland, Maier & Neustadt, L.L.P.

(57) ABSTRACT

A thrust reverser for an aircraft propulsion assembly, including at least one sealing membrane designed to deflect at least one portion of the secondary flow towards a set of cascades when the movable structure of the reverser is in the retracted thrust reversal position, the reverser also including a first flexible hook connecting a first end of the membrane to the fixed structure of the reverser, a second hook connecting a second end of the membrane to the fixed structure or to the movable structure, the second hook being fixed to the (Continued)

radially inner delimiting wall of the secondary vein, or guided by an internal guide fixed to the same radially inner delimiting wall.

8 Claims, 16 Drawing Sheets

(56) References Cited

U.S. PATENT DOCUMENTS

2020/0347800 A1\* 11/2020 Gonidec ................. F02K 1/625
2022/0228541 A1\* 7/2022 Porte ........................ F02K 1/62
2022/0243681 A1\* 8/2022 West ........................ F02K 1/72

FOREIGN PATENT DOCUMENTS

| FR | 3 002 785 A1 | 9/2014 |
| FR | 3 073 572 A1 | 5/2019 |
| FR | 3 076 864 A1 | 7/2019 |
| FR | 3 087 848 A1 | 5/2020 |

\* cited by examiner

THRUST REVERSER COMPRISING MOVABLE CASCADES AND A SEALING MEMBRANE

TECHNICAL FIELD

The invention relates to the field of nacelles and thrust reversers for an aircraft propulsion unit, and, more specifically, to nacelles fitted with movable cascade reversers.

PRIOR ART

Thrust reversers are devices used to divert the flow of air passing through the propulsion unit towards the front, so as to shorten landing distances and limit the load on the brakes on the landing gear.

Cascade reversers currently used in the aviation sector comprise a front frame forming together with the vanes a fixed part of the reverser intended to be connected to a turbomachine casing.

More recent technical developments have enabled movable cascade reversers to be developed, such as described, for example, in documents FR2981989A1, FR2999239A1, FR3002785A1 and FR3073572A1.

Compared to a conventional fixed-vane reverser, the ability of the vanes to move makes it possible to reduce the length of the nacelle, and, consequently, to reduce its mass and the drag it produces.

In designs with fixed or movable vanes, in order to divert at least part of the secondary flow towards the vanes, the reverser is also fitted with blocker doors which at least partially block the secondary flow path when deployed. In a known manner, this forces the air of the secondary flow to pass through the vanes, which then generates the forward counter-thrust airflow.

The doors are generally pivotally mounted on the radially inner wall of the reverser cowls, this wall delimiting the secondary flow path radially outwards. Thus, recesses are provided in this radially inner wall of the reverser cowls in order to receive the blocker doors in a retracted position, which is adopted in direct jet. However, in direct jet, the presence of the recesses and doors is a source of aerodynamic disturbance to the secondary flow. Moreover, their presence locally prevents the installation of an acoustic panel on the radially inner wall of the reverser cowls.

In order to provide a technical solution to this issues, in fixed-vane configurations, it has been proposed to replace the doors by one or more sealing membranes. Such a design is, for example, disclosed in document FR3076864A1. However, these sealing membrane solutions are designed for fixed cascade reversers, and not movable cascade reversers. Moreover, there is still room for improvement in these solutions, particularly in terms of ease of implementation and reliability of deployment.

DISCLOSURE OF THE INVENTION

First of all, one object of the invention is a thrust reverser for an aircraft propulsion unit, the reverser comprising a fixed structure fitted with a radially inner delimiting wall of a secondary flow path of the propulsion unit intended to be passed through by a secondary flow, the reverser also comprising a movable structure including at least one reverser cowl and at least one assembly of cascade vanes, said at least one assembly of vanes comprising a plurality of cascade vanes as well as a rear vane support structure to which a rear end of the plurality of cascade vanes is attached, and a front vane support structure to which a front end of the plurality of cascade vanes is attached, the movable structure being movable in translation relative to the fixed structure along a central longitudinal axis of the reverser, between a forward direct thrust position and a rearward reverse thrust position.

According to the invention, the thrust reverser comprises at least one sealing membrane designed to divert at least part of the secondary flow towards said at least one assembly of cascade vanes, when the movable structure is in the rearward reverse thrust position.

Moreover, the reverser also comprises, associated with said at least one sealing membrane:

first flexible attachment means connecting a first end of the membrane to the fixed structure of the reverser, the first attachment means comprising at one of their ends first means for fixing to the fixed structure of the reverser, second attachment means connecting a second end of the membrane, opposite the first end, to the fixed structure or to the movable structure, the second attachment means being fixed to the radially inner delimiting wall of the secondary flow path, or guided by internal guiding means fixed to this same radially inner delimiting wall.

In addition, the assembly formed by the membrane and the first and second attachment means is guided by front guiding means integral with the front vane support structure, and guided by rear guiding means integral with the rear vane support structure.

The reverser is designed such that in the forward direct thrust position of the movable structure, at least part of the sealing membrane extends along the assembly of cascade vanes.

The reverser according to the invention incorporates one or more sealing membranes, which provide a high level of aerodynamic and acoustic performance for the propulsion unit fitted with such a reverser. In addition, the design specific to the invention provides simplicity of use for the sealing membrane when the movable structure is moved towards its rearward reverse thrust position, leading to the unfolding of this membrane in the secondary flow. It also provides a high level of deployment reliability for this membrane, in particular thanks to the cooperation between the second attachment means and the radially inner delimiting wall of the secondary flow path.

The invention preferably has at least one of the following optional technical features, either separately or in combination.

In the forward direct thrust position of the movable structure, the guiding means are preferably located upstream of the first fixing means of the first flexible attachment means. Moreover, the reverser is also designed such that during at least part of the movement of the movable structure towards the rearward reverse thrust position, said assembly unfolds with the first attachment means bearing on the front guiding means, and with the sealing membrane bearing on the rear guiding means. However, other kinematics can be envisaged, as a function in particular of the relative positioning of the guiding means and attachment means, and as a function of the length of the membrane.

The second attachment means preferably comprise cables.

The second attachment means preferably comprise connecting rods, a first end of each of which is mounted on the radially inner delimiting wall of the secondary flow path, preferably by means of a pivot link or a ball joint. These connecting rods further enhance the unfolding reliability of the sealing membrane, preventing it in particular from remaining stuck inside the reverser cowl or in the rear vane support structure.

Each connecting rod is preferably designed to move from a position projecting into the secondary flow path, adopted when the movable structure is in its forward direct thrust position, to a position folded back downstream, adopted when the movable structure is in its rearward reverse thrust position, and, moreover, elastic means push each connecting rod towards its folded back position.

The aforementioned cables preferably cooperate with the connecting rods, each cable being fixed to a second end of one of the connecting rods associated with this cable, or passing through this associated connecting rod to be fixed to the radially inner delimiting wall of the secondary flow path.

The first flexible attachment means preferably comprise cables.

The front, rear and internal guiding means preferably comprise at least one roller, and/or at least one rotary cylinder, and/or at least one fixed shaft.

A plurality of sealing membranes are preferably associated with said plurality of movable vanes, the membranes following one another in a circumferential direction of the reverser. Optionally, these membranes may partially overlap when they adopt their deployed sealing configuration. Alternatively, only one sealing membrane may be provided associated with each assembly of cascade vanes.

When a plurality of sealing membranes are provided, they can optionally be connected to one another at their radially inner ends in the deployed sealing configuration. However, they can alternatively or simultaneously be connected to one another at points other than their radially inner ends without departing from the scope of the invention.

Each sealing membrane preferably has a generally trapezoidal shape. However, other shapes may be adopted, such as a generally rectangular shape leading to greater overlapping in the deployed sealing configuration. Other specific shapes may also be envisaged for one or more sealing membranes so as to adapt them locally to the geometry of the surrounding elements of the propulsion unit.

The first fixing means of the first flexible attachment means are preferably arranged on or near a deflection edge forming an integral part of the fixed structure of the reverser.

Another object of the invention is a nacelle for an aircraft propulsion unit, comprising at least one fan cowl, as well as a thrust reverser as described above.

Finally, another object of the invention is a propulsion unit for an aircraft, comprising a turbomachine and such a nacelle.

Other advantages and features of the invention will become apparent in the non-limiting detailed description below.

BRIEF DESCRIPTION OF THE DRAWINGS

The following detailed description refers to the accompanying drawings in which.

DESCRIPTION OF THE EMBODIMENTS

Figure 1:
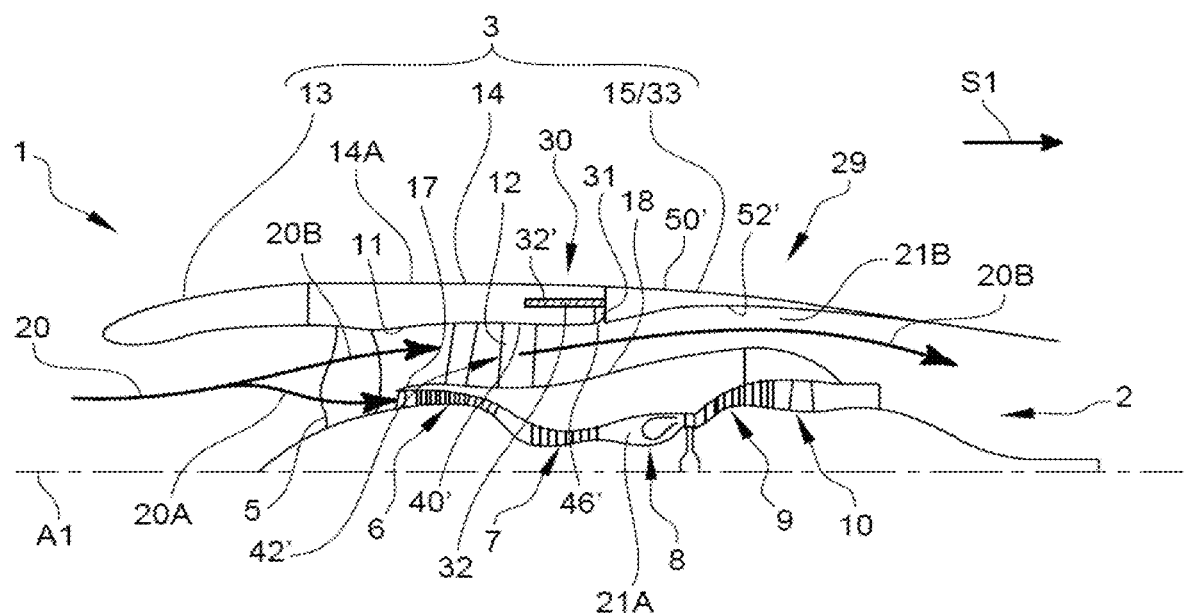
FIG. 1 is a schematic longitudinal sectional half-view of a propulsion unit, comprising a thrust reverser according to the invention, shown in direct thrust configuration.
Figure 2:
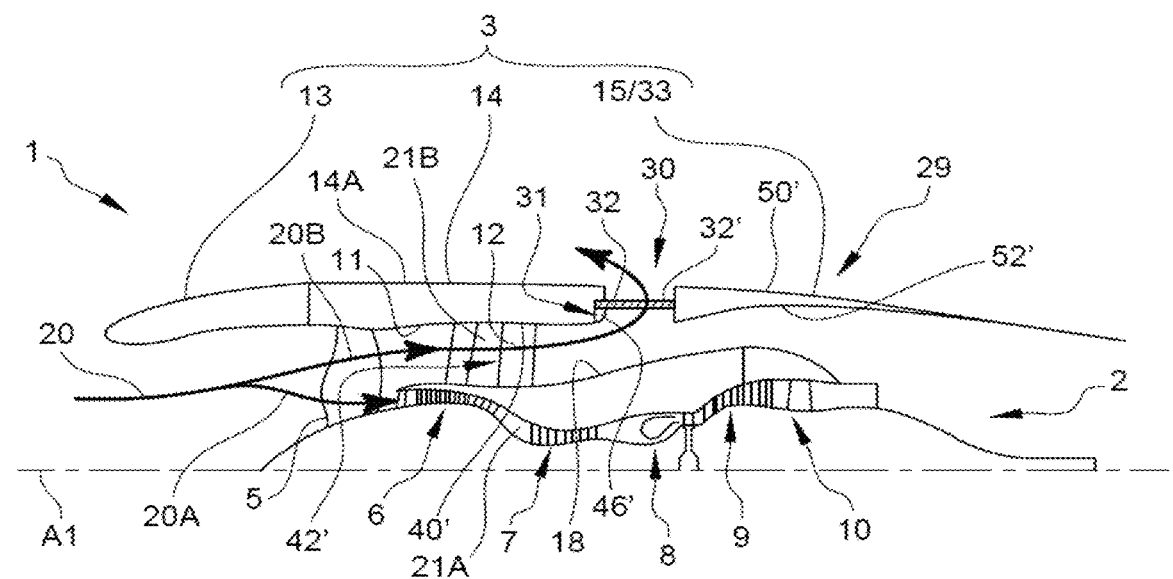
FIG. 2 is a schematic longitudinal sectional half-view of the propulsion unit shown in FIG. 1, with the reverser shown reverse thrust configuration.

FIGS. 1 and 2 show an aircraft propulsion unit 1, having a central longitudinal axis A1.

Hereinafter, the terms "upstream" and "downstream" are defined with respect to a general direction S1 of gas flow through the propulsion unit 1 along the axis A1 when it generates a thrust. These terms "upstream" and "downstream" could respectively be replaced by the terms "front" and "rear" with the same meaning.

The propulsion unit 1 comprises a turbomachine 2, a nacelle 3 as well as a pylon (not shown), intended to connect to the propulsion unit 1 to a wing (not shown) of the aircraft.

In this example, the turbomachine 2 is a twin-spool turbofan engine comprising, from front to rear, a fan 5, a low-pressure compressor 6, a high-pressure compressor 7, a combustion chamber 8, a high-pressure turbine 9 and a low-pressure turbine 10. The compressors 6 and 7, the combustion chamber 8 and the turbines 9 and 10 form a gas generator. The turbofan engine 2 is provided with a fan casing 11 connected to the gas generator by structural arms 12.

The nacelle 3 comprises a front section forming an air inlet 13, a middle section 14 which includes two fan cowls 14A covering the fan casing 11, and a rear section 15.

In operation, an air flow 20 enters the propulsion unit 1 through the air inlet 13, passes through the fan 5 and then splits into a primary flow 20A and a secondary flow 20B. The primary flow 20A flows in a primary gas flow path 21A passing through the gas generator. The secondary flow 20B flows in a secondary flow path 21B surrounding the gas generator. The secondary flow path 21B is delimited radially inwards by a fixed inner fairing which surrounds the gas generator. In this example, the fixed inner fairing comprises a first portion 17 belonging to the middle section 14, and a second portion 18 extending backwards from the first portion 17, so as to form part of the rear section 15.

This second portion 18 forms an integral apart of a fixed structure of a thrust reverser which will be described below. This same portion will hereinafter be referred to as the radially inner delimiting wall 18 of the secondary flow path 21B.

Radially outwards, the secondary flow path 21B is delimited by the fan casing 11, and, in the configuration shown in FIG. 1, by one or more movable reverser cowls 33 forming part of the rear section 15 of the nacelle 3, which will be described below. More specifically, between the fan casing 11 and the reverser cowls 33, an outer shell 40' of an intermediate casing 42' is provided, the latter comprising the aforementioned structural arms 12, the radially outer end of which is fixed to this shell 40'. It therefore also helps delimit the secondary flow path 21B radially outwards, being located in the downstream axial extension of the fan casing 11.

The nacelle 3 therefore has a thrust reverser 30 centred on the axis A1 and comprising, on the one hand, a fixed structure 31, and, on the other, a structure 29 that can be moved relative to the fixed structure 31.

The fixed structure 31 of the reverser comprises a deflection edge 46' supported fixedly downstream by the outer shell 40' of the intermediate casing. Moreover, this shell 40' as well as the fan casing 11 can be considered to form part of the fixed structure 31 of the reverser, in particular for fixing the sealing membrane which will be described below. Radially inwards, the fixed structure 31 also comprises the radially inner delimiting wall 18 of the secondary flow path 21B.

For its part, the movable structure 29 comprises the aforementioned movable reverser cowls 33, for example two cowls 33 each extending over an angular range of around 180°. This configuration with two cowls 33 is particularly well suited to a nacelle design where the cowls/walls 18 are also mounted in an articulated manner, such that the reverser 30 then has a so-called "D-duct" structure. In this structure, the cowls 18, 33 are connected so as to open/shut simultaneously during maintenance operations on the engine. However, other structures are possible, such as a so-called "C-duct" structure or a so-called "O-duct" structure.

Each reverser cowl 33 has a radially outer wall 50' forming a nacelle outer aerodynamic surface, as well as a radially inner wall 52', helping to delimit the secondary flow path 21B radially outwards.

In addition to the aforementioned reverser cowls 33, the movable structure 29 comprises at least one assembly 32' of cascade vanes 32, these being arranged adjacently in a circumferential direction of the reverser and propulsion unit.

FIG. 1 shows the reverser 30 in a direct thrust configuration. In this configuration, the two movable cowls 33 and the two assemblies of vanes 32' respectively associated with them are in a closed position, or forward position, a so-called forward direct thrust position of the movable structure 29. In this same position, the vanes 32 are housed in a space delimited radially inwards by the deflection edge 46', the intermediate casing outer shell 40', and possibly by the fan casing 11. This space is also delimited radially outwards by the fan cowls 14A. In direct thrust configuration, the movable structure 29 bears axially forwards against the deflection edge 46', which thus enables the secondary flow 20B to be channelled towards the back of the propulsion unit 1 so as to generate thrust.

FIG. 2 shows the same reverser 30 in a reverse thrust configuration. In this configuration, the movable reverser cowls 33 and the entire movable structure 29 are in an open position, or rearward position, in which the cowls 33 are longitudinally distant from the deflection edge 46' so as to define a radial opening of the secondary flow path 21B. The vanes 32 extend through this radial opening. As will be described later on, in this reverse thrust configuration, means specific to the invention are used to direct the secondary flow 20B towards the vanes 32, which orient the flow redirected in this way towards the front of the propulsion unit 1 with the aim of generating the desired counter-thrust.

Thus, in FIG. 2, the vanes 32 and the movable cowls 33 of the movable system 29 are shown in a rearward position, corresponding to the rearward reverse thrust position of the movable structure 29. The latter can therefore be moved in translation relative to the fixed structure 31 along the axis A1, between the two positions shown in FIGS. 1 and 2.

Figure 3:
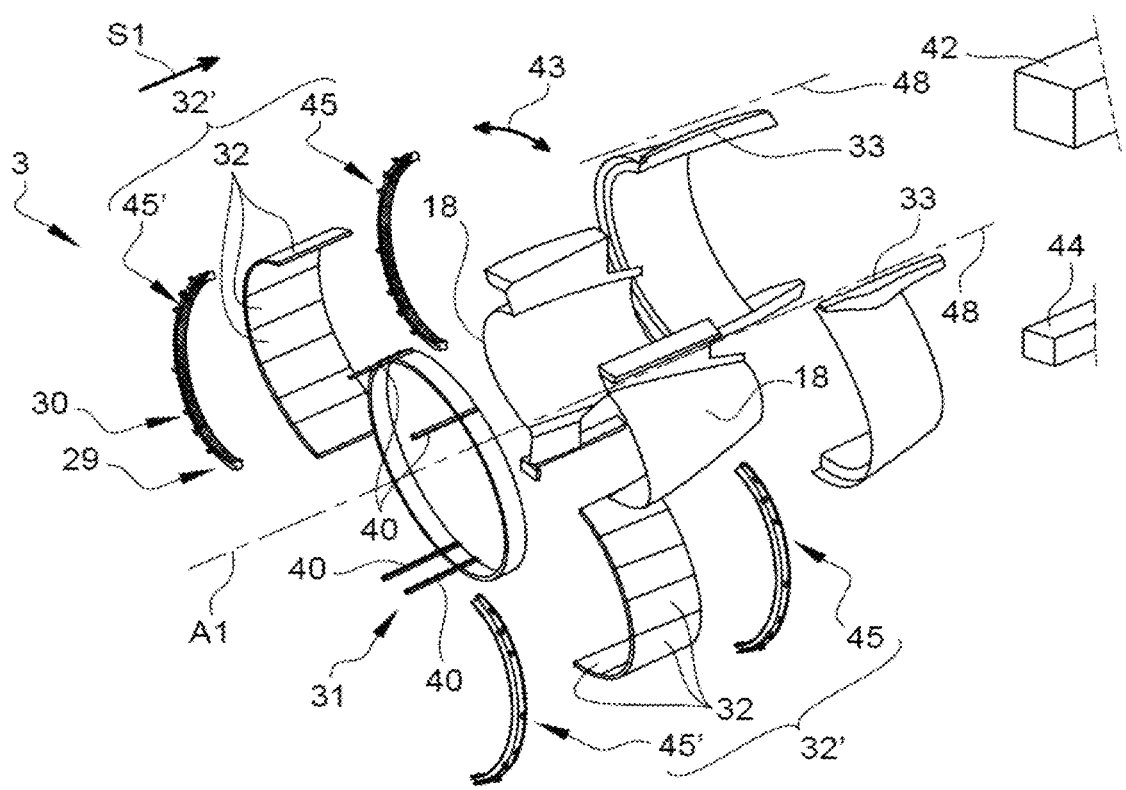
FIG. 3 is an exploded perspective view of part of the nacelle of the propulsion unit shown in the preceding figures, showing in particular the elements of the thrust reverser.

FIG. 3 is an exploded perspective view of certain elements of the nacelle 3, including part of the fixed structure 31 of the reverser 30, which has the general shape of a ring centred on the axis A1, also corresponding to the central longitudinal axis of the reverser. In this preferred embodiment of the invention, the fixed structure 31 is fitted with elements for guiding the vanes 32 as they move between the forward and rearward positions, these elements comprising axial rails 40. For example, these are two rails 40 integral with an upper part of the ring, and two other rails 40 integral with a lower part of this same ring. Here, the rails 40 are fixed to the fixed structure 31 by their rear end, whilst their front end is fixed to another casing (not shown in FIG. 3). The rails 40 thus guide the vanes 32 as they move axially, but also, in reverse thrust configuration, take up aerodynamic forces, mainly radial and tangential ones.

FIG. 3 schematically shows the vanes 32, which follow one another in the circumferential direction 43. Here, they are grouped into two lateral assemblies each comprising a plurality of vanes 32, these two assemblies being referred to as assemblies of cascade vanes 32'.

Figure 4:
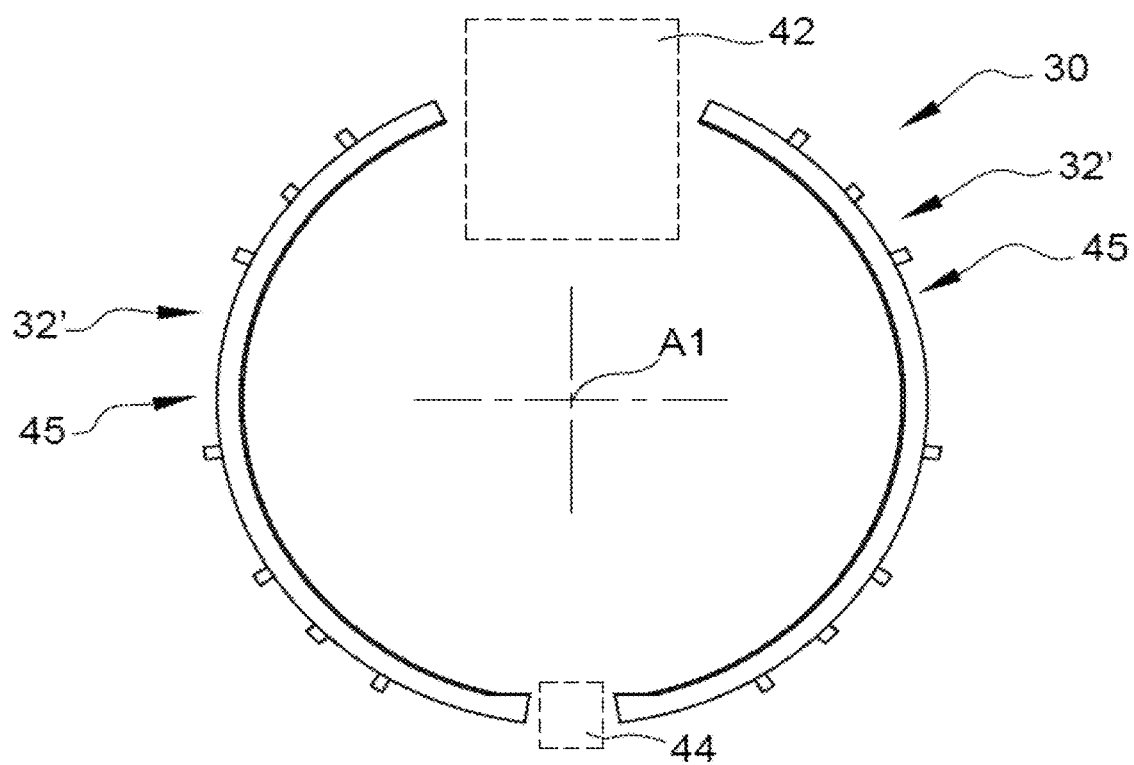
FIG. 4 is an axial view of the rear vane support structures shown in the preceding figure.

Thus, each assembly of vanes 32' has a plurality of cascade vanes 32, and extends over an angular range close to 180°. The two assemblies 32' are preferably separated laterally from each other at their ends facing each other in pairs, to provide upper and lower spaces respectively intended for the passage of the pylon 42 and a lower longitudinal beam 44. Each assembly of vanes 32' also has a rear vane support structure 45 to which a rear end of each of the cascade vanes 32 of the assembly 32' is attached, and a front vane support structure 45' to which a front end of each of these cascade vanes 32 of the assembly 32' is attached. The rear 45 and front 45' structures are also referred to as "rear and front vane frames", respectively, and they each extend circumferentially along their associated side assembly 32', at the same or similar angular range as can be seen in FIG. 4. The rear end of each vane 32 is therefore intended to be fixed to its associated rear structure 45 using conventional fixing means, just as the front end of each vane 32 is intended to be fixed to its associated front structure 45' also using conventional means.

As stated above, this configuration is particularly well suited to a so-called "D-duct" structure, which is preferable for the present invention.

In a known manner, the fixed structure 31 also has members (not shown) forming radial and/or tangential and/or axial stops for the vanes 32 of the assemblies 32'.

In FIG. 3, the elements of the nacelle 3 are completed by the articulated cowls 18, 33, giving the nacelle a "D-duct" structure. In particular, the pivot axis 48 associated with each reverser cowl 33 has been shown, this pivot axis 48 being parallel or substantially parallel to the axis A1, and enabling the cowl 33 to be rotatable between an open maintenance position and a closed flying position, shown in FIG. 3.

Figure 5:
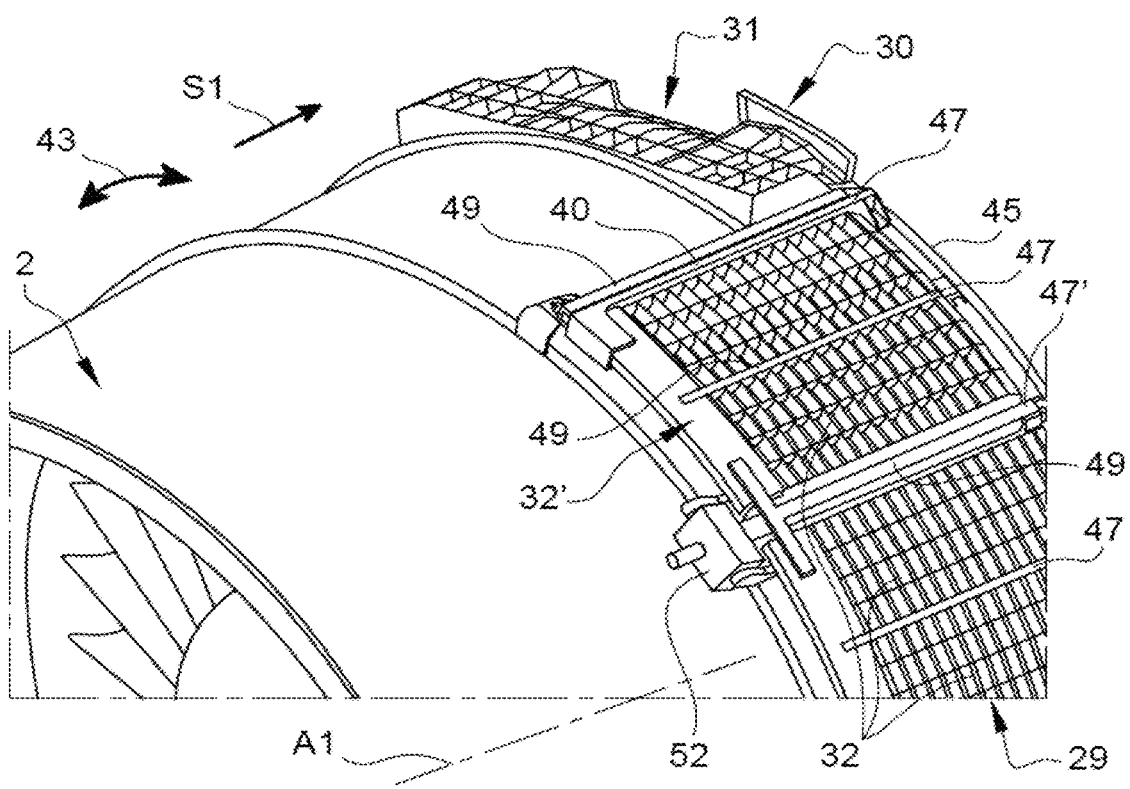
FIG. 5 is a partial perspective view, in more detail, of part of the reverser shown in the preceding figures.

FIG. 5 shows part of one of the two assemblies of vanes 32' in more detail. The two assemblies 32' are preferably identical or similar in design, being symmetrical with respect to a vertical and longitudinal plane passing through the axis A1. Consequently, hereinafter, the description provided will apply equally to each of these two assemblies 32'.

The assembly of vanes 32' comprises inter-vane axial elements 47, 47' arranged between the vanes 32, in the circumferential direction 43 of the nacelle and its reverser 30. These inter-vane axial elements 47, 47' extend over all or part of the axial length of the assembly 32', and are thus arranged between the vanes 32. These elements 47, 47' can form axial sliding tracks for the movable system 29 with their radially outer surface 49. Moreover, there can be various types of elements, including first elements 47 which act as a mechanical connection between the vanes 32, and second elements 47' that provide an additional function of mechanical reinforcement for an actuator 52 of the reverser. The reinforcement 47' can take the form of an axial sleeve housing at least part of the actuator 52 internally. Other types of reinforcement elements can, nevertheless, be envisaged without departing from the scope of the invention. In addition, it should be noted that in a known manner, the rear end of the actuators 52 is designed to be fixed to the rear support structure 45 using dedicated fixing members.

Figure 6:
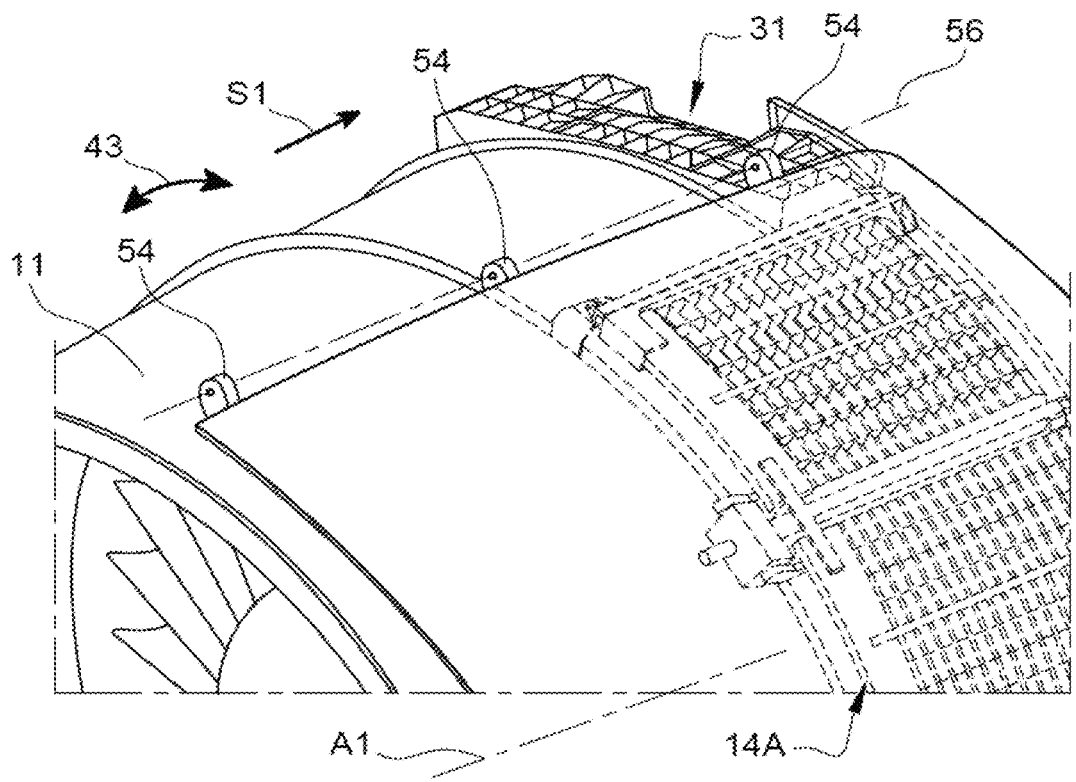
FIG. 6 is a partial perspective view, in more detail, of a front part of the nacelle shown in the preceding figures, with a single fan cowl shown.

With reference now to FIG. 6, one of the two fan cowls 14A is shown which has the feature here of being pivotally mounted between an open maintenance position and a closed flying position, shown in FIG. 6. It is pivotally mounted using hinges 54 axially spaced apart from one another and which together define a pivot axis 56 of the cowl 14A. This axis 56 is parallel to the axis A1, or substantially parallel to the latter. Symmetrical mounting is provided for the second pivoting fan cowl (not shown in FIG. 6). However, a solution involving fixed fan cowls is also covered by the present invention.

Figure 7:
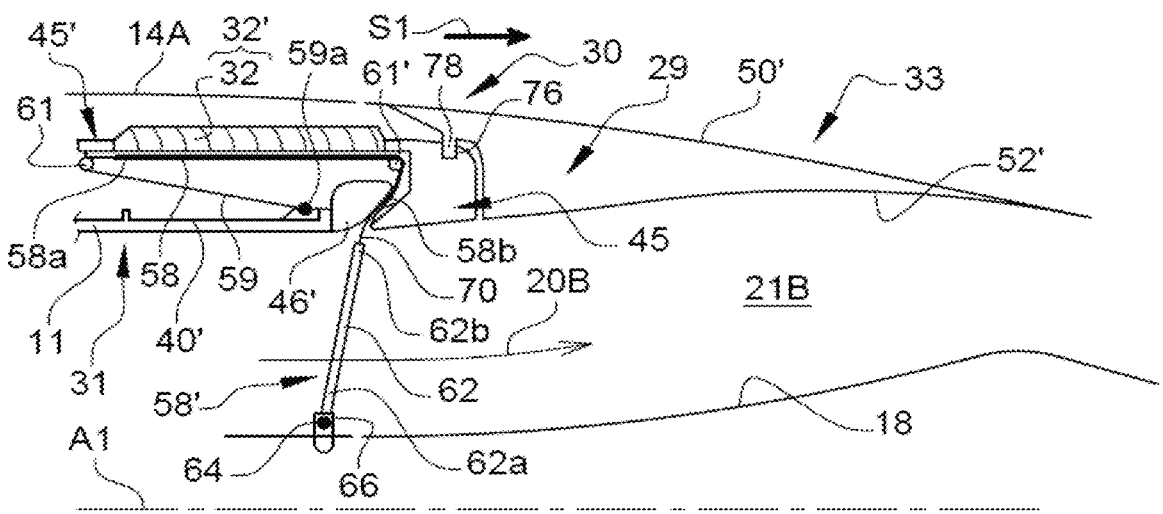
FIG. 7 is a schematic longitudinal sectional half-view of a rear part of the propulsion unit shown in FIG. 1, in more detail, and still with the reverser in direct thrust configuration.
Figure 7A:
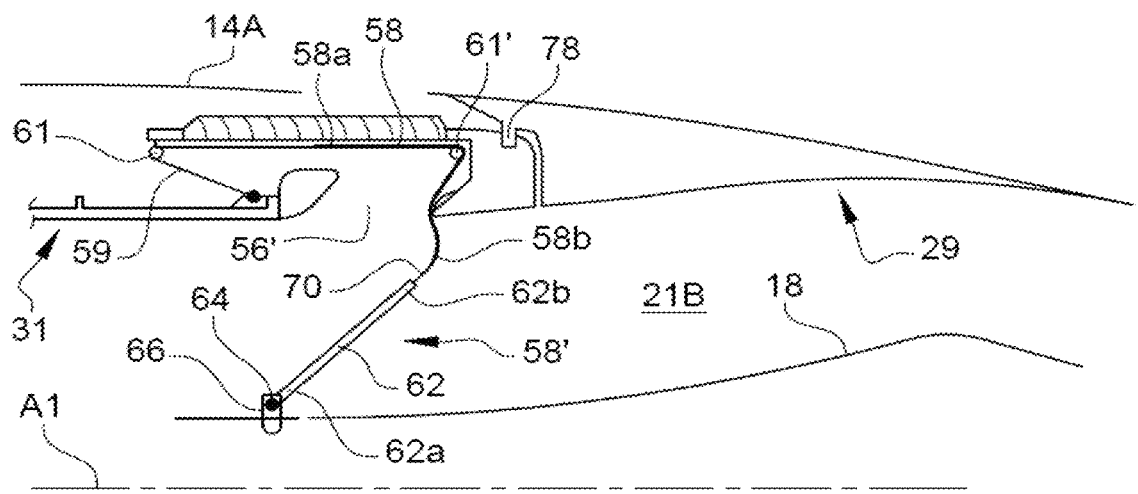
FIG. 7A is a schematic longitudinal sectional half-view similar to that of the preceding view, with the reverser in an intermediate configuration between the direct thrust configuration and the reverse thrust configuration.
Figure 8:
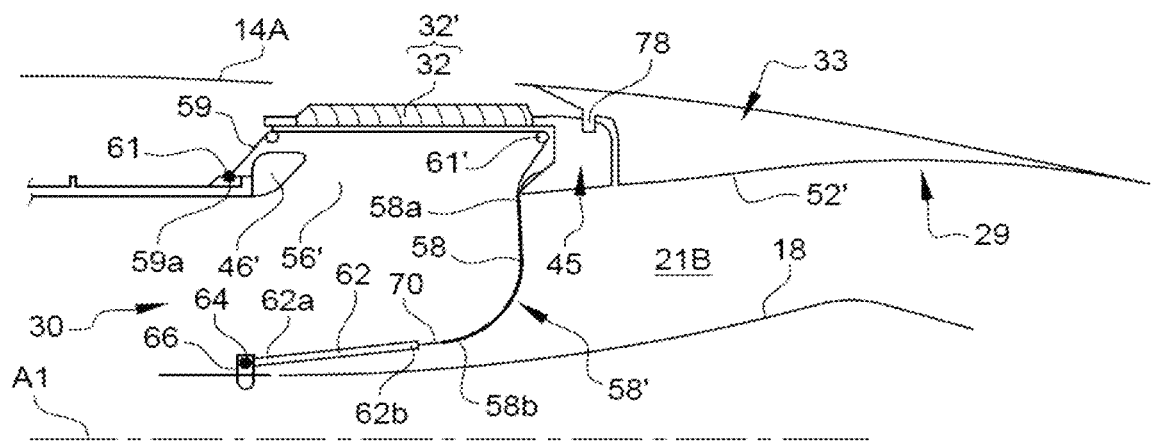
FIG. 8 is a schematic longitudinal sectional half-view of a rear part of the propulsion unit shown in FIG. 2, in more detail, and still with the reverser in reverse thrust configuration.
Figure 9:
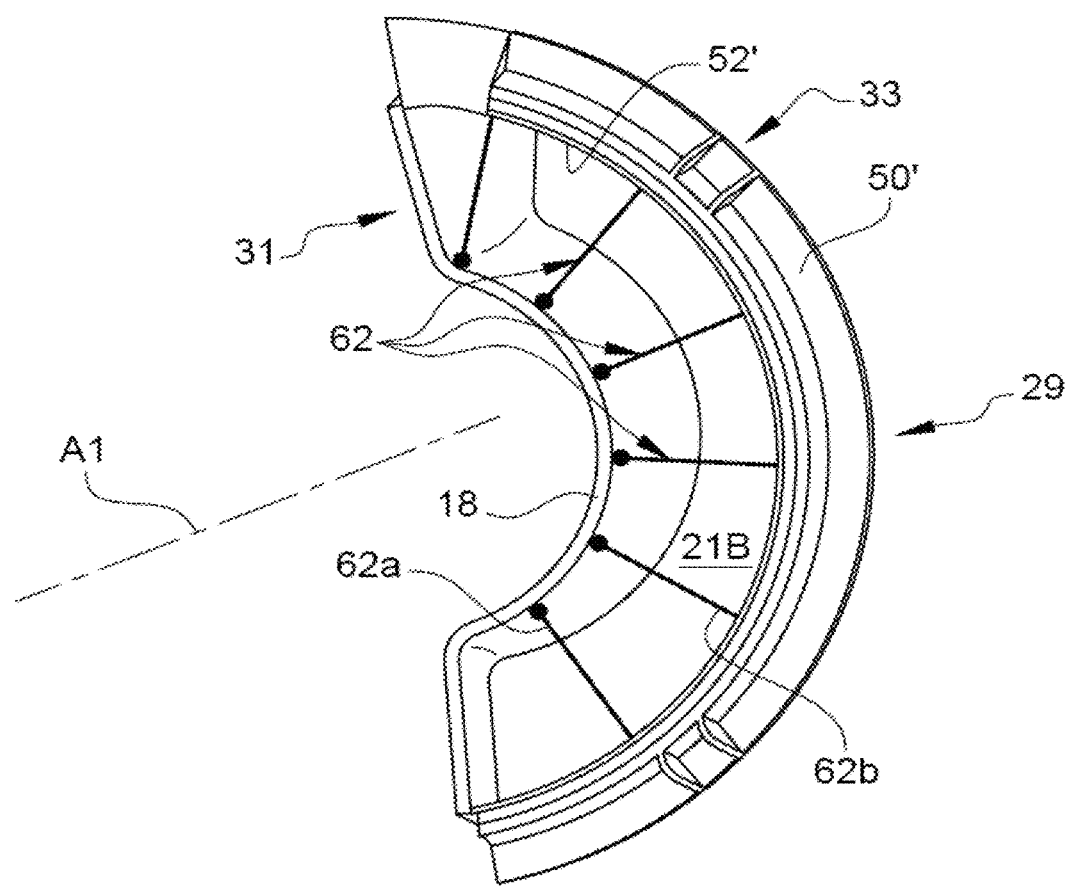
FIG. 9 is a perspective view of the reverser shown in FIGS. 1 and 7, shown in direct thrust configuration.
Figure 10:
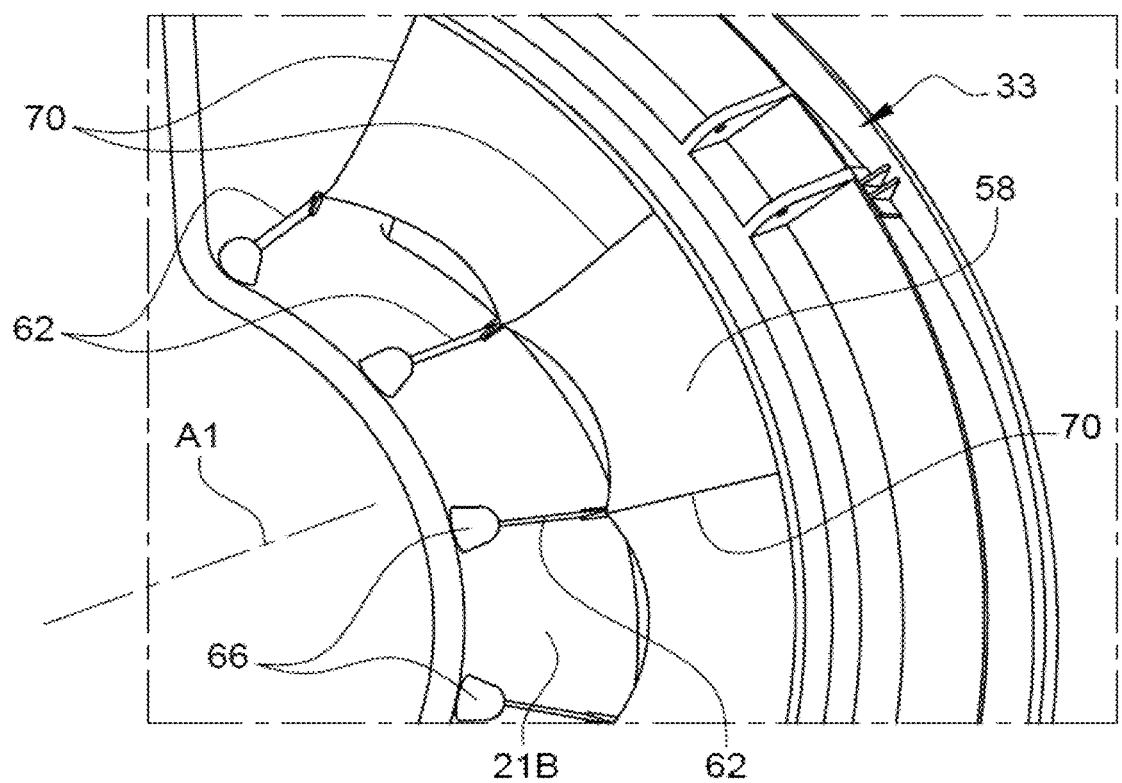
FIG. 10 is a perspective view of the reverser shown in FIG. 8, shown in reverse thrust configuration.

The direct thrust configuration is also shown in FIGS. 7 and 9, whilst the rearward reverse thrust position of the movable structure 29 is also shown in FIGS. 8 and 10. FIG. 7A, for its part, shows the reverser in an intermediate configuration relative to the two previous ones, as adopted during the axial movement towards the rear of the movable structure 29.

FIG. 8 shows that the recessed radially inner wall 52' of the reverser cowls 33 reveals a passage opening 56' upstream in the secondary flow path 21B, towards the cascade vanes 32. The opening 56' is therefore also delimited upstream by the deflection edge 46', which flares radially outwards towards the rear, in order to delimit an air flow intended to pass through the plurality of vanes 32 when the movable system 29 is in this rearward reverse thrust position. In other words, the deflection edge 46' gradually moves away from the axis A1 from front to rear, in order to guide/divert the air towards the plurality of vanes 32 in reverse thrust configuration.

In order to divert at least part of the secondary flow 20B towards the passage opening 56' defined axially between the deflection edge 46' and the upstream end of the rear support structure 45, the reverser 30 has one or more sealing membranes 58 associated with each assembly of cascade vanes 32'. For this aspect, an embodiment will be described in which a single membrane 58 is associated with each reverser cowl 33, and therefore with each assembly of cascade vanes 32', having an angular range identical or similar to that of the cowl. However, other embodiments will be shown with a plurality of circumferentially adjacent membranes associated with each of the two cowls 33, and therefore with each of the two assemblies of vanes 32'.

Similarly, only the cooperation between a membrane 58 and its associated cowl 33 will be described below, given that this cooperation is identical or similar for the two cowls of the reverser 33.

The membrane 58 can be made of a material known to a person skilled in the art for this type of application. For example, it can be a non-impregnated fabric, for example aramid fibres. The membrane 58 can also be produced using a composite material, the matrix of which is particularly flexible, for example aliphatic polyurethane or silicone. In this case, the matrix has a low bending recovery capacity and the resulting structure behaves like a membrane. One of the major properties of this membrane 58 is that it can be folded in a perfectly reversible manner (elastically or by fibres sliding) with a very small radius of curvature in relation to its surface, and that it has a very small thickness, for example of around 0.1 to 3 mm. For informational purposes, it should be noted that this membrane 58 behaves likes a boat sail when it is put under pressure.

One of the special features of the invention involves the attachment of the membrane 58 to the reverser 30. In order to do this, with reference to FIGS. 7 to 13, first flexible attachment means are provided connecting a first end 58a of the sealing membrane 58 to the fixed structure 31 of the reverser, preferably the intermediate casing outer shell 40' or the deflection edge 46'. In order to do this, the first flexible attachment means comprise cables 59, which are firmly connected to the first end 58a of the sealing membrane 58. One end of these cables 59 is integral with first fixing means 59a forming an integral part of the first flexible attachment means. These first fixing means 59a are directly mounted on the intermediate casing outer shell 40' or on the deflection edge 46', or on any other element of the fixed structure 31 of the reverser 30. The first fixing means 59a, shown schematically in the figures, are produced in a conventional manner, and therefore preferably arranged on or near the deflection edge 46'.

The cables 59, spaced circumferentially from one another, cooperate with front guiding means 61 integral with and fixed to the front vane support structure 45'. This involves one or more rollers, one or more rotary cylinders, and/or one or more fixed shafts such as rods. The front guiding means 61 are used to deflect the cables 59 in the forward direct thrust position of the movable structure, as these means are located upstream and at a distance from the first fixing means 59a. In this position, the cables 59 thus run upstream and radially outwards in the direction of the first fixing means 59a against which they bear and which they bypass, in order then, as a result of deflection, to extend axially downstream parallel to the plurality of vanes 32, radially inwards relative threreto. Moreover, still in this same position, at least part of the membrane 58 also extends along and parallel to the plurality of vanes 32. In the embodiment shown, the membrane 58 extends beyond the vanes 32, as it bears against and bypasses rear guiding means 61' integral with and fixed to the rear vane support structure 45. This also involves one or more rollers, one or more rotary cylinders, and/or one or more fixed shafts such as rods. The rear guiding means 61' are also used to deflect the membrane 58 in the forward direct thrust position of the movable structure 29, as this membrane then extends radially inwards and slightly upstream, such that its second end 58b is enclosed/gripped between the upstream end of the rear vane support structure 45 and the deflection edge 46'. In order to avoid any possible damage to the membrane 58 caused by this gripping, the deflection edge 46' can locally have a notch with a shape adapted to receive the upstream end of the rear vane support structure 45. In this way, the membrane 58 is also pressed into this notch in the deflection edge 46' by the upstream end of this support structure 45.

The front and rear guiding means 61, 61' define winding axes parallel to each other, preferably oriented tangentially with respect to the axis A1.

In addition, second attachment means connect this second end 58b of the sealing membrane 58, opposite the first end of the membrane 58a, to the radially inner delimiting wall 18 of the secondary flow path 21B. More specifically, in this preferred embodiment, the second attachment means comprise, at one of their ends, second fixing means 66, directly fixed to this wall 18. In this respect, it should be noted that the means 66 are preferably fixed upstream of the part of the wall 18 that constitutes the IFS (Inner Fixed Structure) cowl, as this IFS cowl is designed to be pivoted with the rest of the "D-duct" door, in order to carry out engine maintenance operations. They are preferably fixed to an upstream part of the wall 18, near or very near the IFS cowl, as shown in FIGS. 7 and 8. This upstream part of the wall 18 in front of the IFS cowl, also known as the kit engine, then forms an integral part of the reverser by virtue of the connection of the second end 58b of the sealing membrane 58 to this same upstream part.

The sealing membrane 58 as well as its associated first and second attachment means, respectively arranged on either side thereof, form an assembly 58' guided by the front and rear guiding means 61, 61', and fixed to the fixed structure 31 by the first and second fixing means 59a, 66.

When the movable structure 29 assumes its forward direct thrust position, at least part of the sealing membrane 58 extends axially, being arranged radially between the cascade vanes 32 and the part of the fixed structure 31 formed by the fan casing 11, the outer shell 40' and the deflection edge 46'. The membrane 58 preferably radially covers all or a very large part of the length of the vanes 32.

Likewise, as shown in FIG. 8, when the movable structure 29 assumes its rearward reverse thrust position, the sealing membrane 58 partly bears against the upstream end of the rear vane support structure 45.

In this way, the part of the membrane 58 that is located radially inwards relative to its bearing area on the structure 45 obstructs at least part of the secondary flow path 21B, thereby diverting at least part of the secondary flow 20B towards the passage opening 56', in the direction of the vanes 32.

In operation, when the movable structure 29 moves axially towards the rear in the direction of its rearward reverse thrust position, the front guiding means 61 move axially closer to the first fixing means 59a, whilst the cowl 33 and the rear support structure 45 move away from the deflection edge 46' downstream, revealing the passage opening 56'. The assembly 58' remains under tension between the guiding means 61, 61', and it unfolds in such a way that the membrane 58, also tensioned by the air entering through the opening 56', expands radially inwards into the secondary flow path 21B. An intermediate deployment configuration is shown in FIG. 7A.

During at least part of the movement of the movable structure 29 towards the rearward reverse thrust position, the assembly 58' unfolds with the first flexible attachment means 59 bearing on the front guiding means 61, and moving relative thereto by slipping or rolling on these same means 61. At the same time, the sealing membrane 58 remains in contact with the rear guiding means 61', and moves relative thereto by sliding or rolling on these same means 61', until it is fully unfolded in the secondary flow path 21B, as shown in FIGS. 8 and 10.

Figure 11:
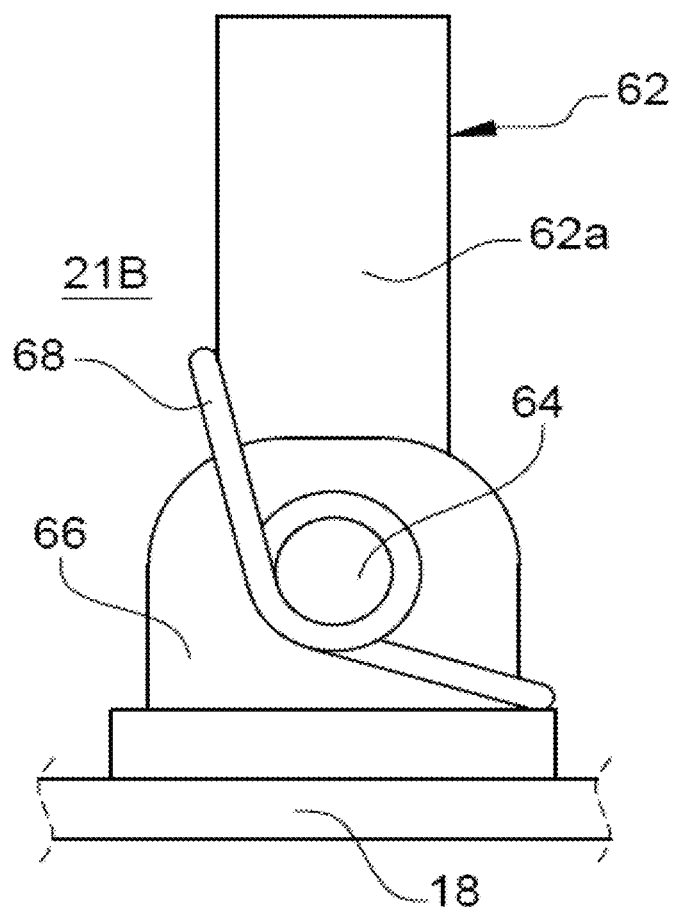
FIG. 11 is a schematic view of one of the connecting rods for the sealing membrane of the reverser shown in the preceding figures, with the connecting rod shown in a protruding position as adopted in direct thrust configuration of the reverser.
Figure 12:
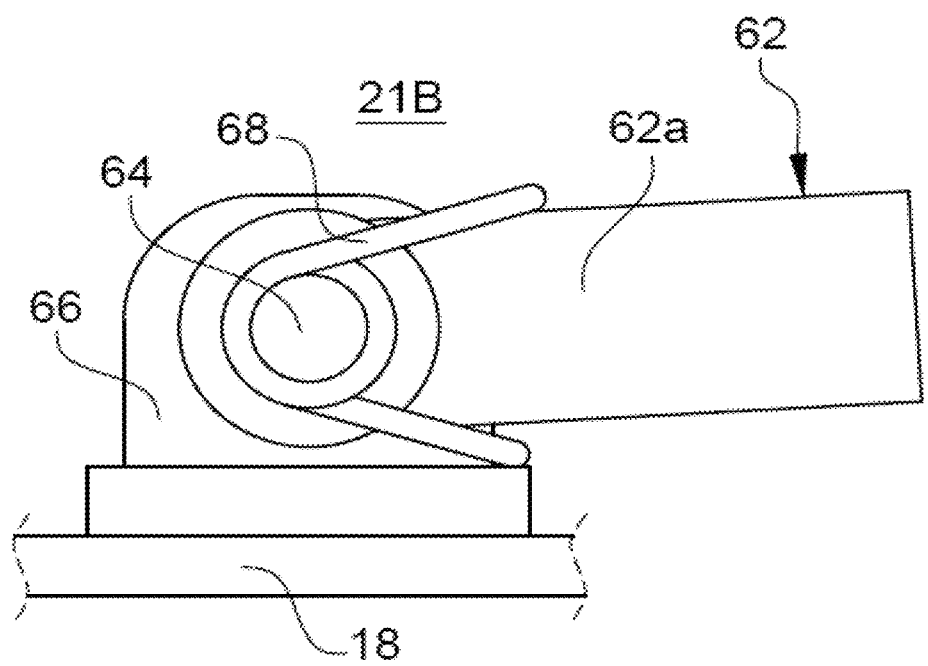
FIG. 12 is a schematic view of the connecting rod shown in FIG. 11, shown in a folded-back position as adopted in reverse thrust configuration of the reverser.
Figure 13:
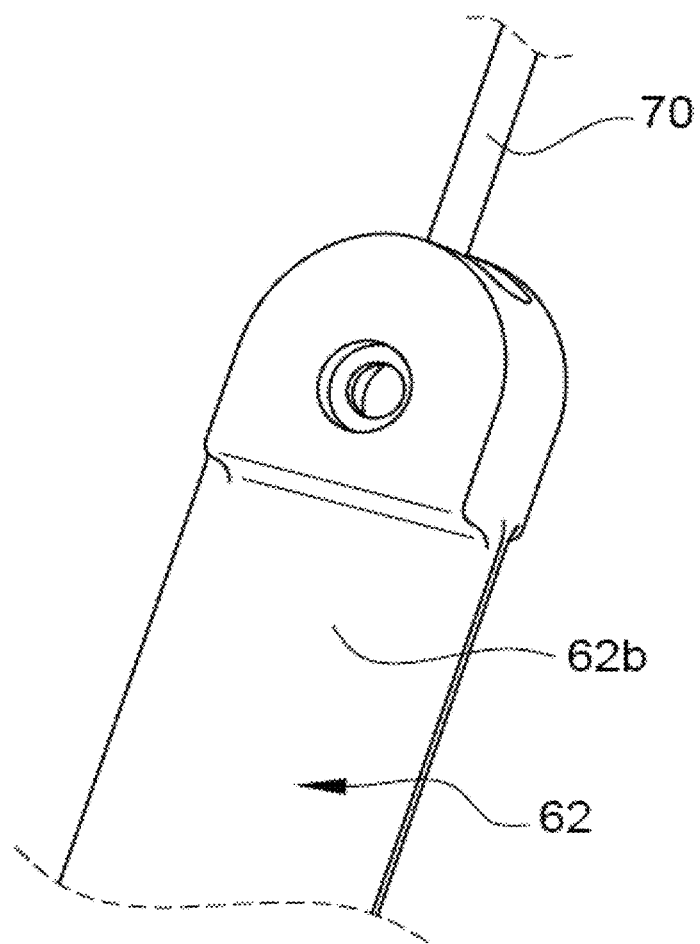
FIG. 13 is a perspective view of the connecting rod shown in FIGS. 11 and 12, in its protruding position.

In this preferred embodiment, the second attachment means comprise connecting rods 62, a first end 62a of each of which is mounted on the wall 18, preferably by means of a pivot link or a ball joint 64 shown in more detail in FIGS. 11 and 12. This link 64 is established by means of the fitting 66 fixed to the fixed wall 18 and cooperating with the first end of the connecting rod 62a.

The connecting rods 62 are circumferentially spaced apart from one another within the secondary flow path 21B, and they can vary in number, for example, from two to ten, depending on the angular range of the membrane 58.

Each connecting rod 62 is designed to move from a position projecting radially into the secondary flow path 21B, which is shown in FIGS. 7 and 9 and adopted when the movable structure 29 is in its forward direct thrust position, to a position folded back downstream, shown in FIGS. 8 and 10 and adopted when the movable structure 29 is in its rearward reverse thrust position. In the projecting position, each connecting rod 62 can adopt a radial or substantially radial orientation relative to the axis A1, whilst in the folded back position, each connecting rod 62 can adopt an axial or substantially axial orientation.

Elastic means, referred to as elastic return means 68, tend to tilt each connecting rod 62 towards its folded back/retracted position in FIG. 12, in particular when the connecting rod is in its projecting position corresponding to the flight position of the reverser. In this way, at the start of deployment of the reverser, each connecting rod 62 exerts a rearward and downward thrust on the membrane 58 which pulls it into the flow path so that the flow at the start of transit does not jam the membrane in the fan cowl 33.

The second end 62*b* of each connecting rod 62, opposite the first end 62*a*, can be connected directly to the second end 58*b* of the membrane 58. However, other preferred solutions are selected, such as those that integrate cables within the second attachment means.

In the embodiment shown in FIGS. 7 to 13, the cables 70 cooperate with the connecting rods 62 by each being fixed to the second end 62*b* of one of the connecting rods associated with this cable. Alternatively, the cables 70 could pass through their associated connecting rods 62 to be fixed to the radially inner delimiting wall 18 of the secondary flow path, for example via the fittings 66. According to yet another possible alternative, only cables 70 could be provided for these second attachment means, without the connecting rods.

Preferably, as shown best in FIG. 10, the cables 70 then run over the membrane 58, to which they are conventionally attached to reinforce the mechanical strength of this membrane. These cables 70 therefore also act as a reinforcement for the membrane 58, and they are preferably circumferentially spaced apart from one another, being oriented substantially radially. Still preferably, each cable 70 extends along the membrane 58 from its second end 58*b* to its first end 58*a*, possible going beyond this first end 58*b*, in order to preferably form the cables 59 of the first attachment means. In other words, according to a preferred embodiment, the same cables 59, 70 form the first and second attachment means, passing through the membrane 58 which they reinforce mechanically.

In this respect, it should be noted that the cables 59, 70 can have any sectional shape, and can be made from a large variety of materials, not necessarily metallic ones.

FIGS. 7, 7A and 8 show another feature of the rear structure 45, which involves establishing the axial connection with the associated reverser cowl 33, in its closed flight position. Indeed, the rear end of the structure 45 comprises an axial connecting member 76 in the form of an annular groove open radially outwards, cooperating with a complementary axial connecting member 78 provided on a front end of the reverser cowl 33. This member 78 preferably has the form of a radially inward protrusion, housed in the groove 76 to obtain axial coupling in the closed position of the cowl 33. When the latter is opened towards its open maintenance position, the protrusion 78 is removed from the groove 76. A solution providing additional radial coupling could be selected for the members 76, 78, without departing from the scope of the invention. Radial forces are also preferably transmitted thanks to the members 76, 78. In the embodiment shown in FIGS. 7, 7A and 8, only negative radial forces (from the outside to the inside) are transmitted. Nevertheless, a connection able to transmit radial forces in both directions could be provided without departing from the scope of the invention.

Thanks to the presence of the membrane 58 beneath the plurality of vanes 32 in the forward direct thrust position, and the absence of conventional flaps, the entire length of the reverser cowl 33 can advantageously be fitted with an acoustic liner, for example in the form of a panel defining the radially inner wall 52'.

Figure 14:
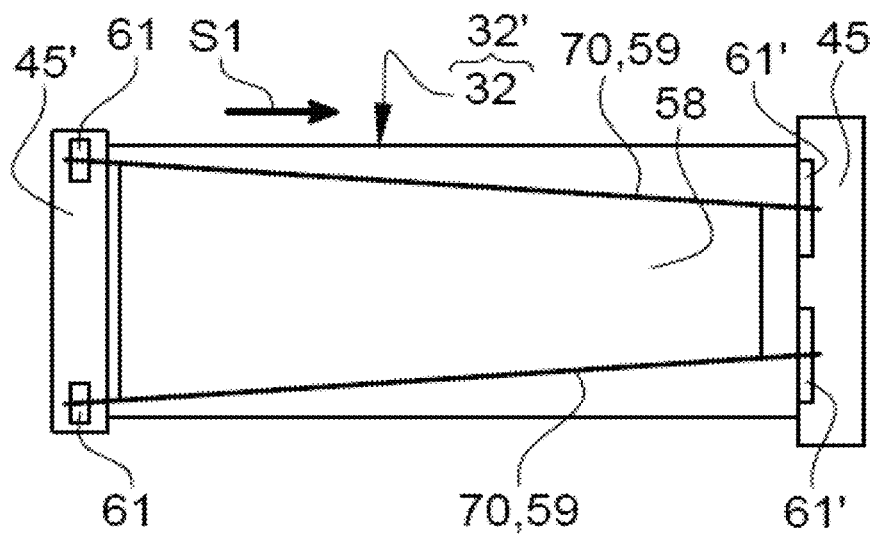
FIG. 14 is a bottom view of part of the reverser, according to another preferred embodiment of the invention.

FIG. 14 shows another preferred embodiment of the invention, in which a plurality of circumferentially adjacent membranes 58 are designed to be associated with each of the two cowls 33, and therefore with each of the two assemblies of vanes 32' (a single membrane, however, being shown in these figures).

In this preferred embodiment, each membrane 58 has, at its two circumferential ends, respectively two cables which extend axially beyond this same membrane so as to form the cables 59, 70 of the first and second attachment means. The front guiding means take the form of two rollers 61 here respectively guiding the two cables 59, whilst the downstream guiding means 61' take the form of two rollers 61' designed to guide the membrane 58 and the two cables 70. In the alternative shown in FIG. 15, the two rollers are replaced by a single, longer roller or rod 61'.

Figure 15:
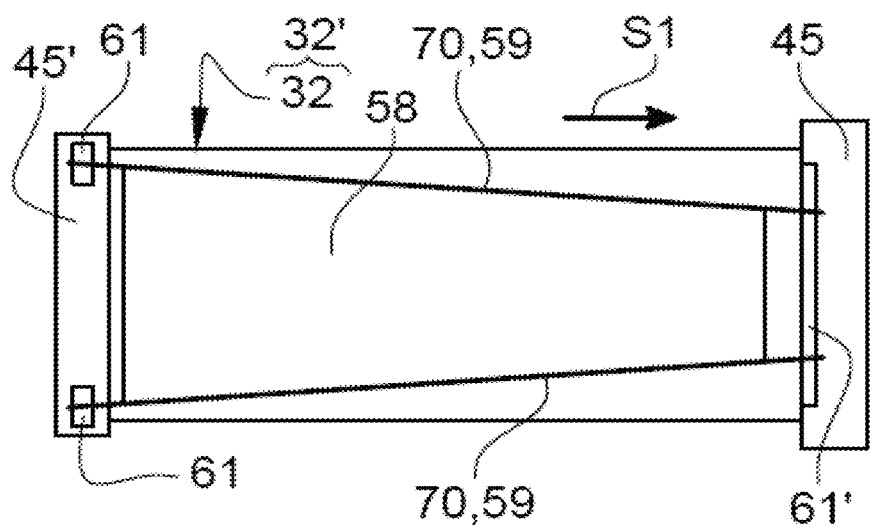
FIG. 15 is a bottom view similar to that of the preceding figure, according to an alternative embodiment.

The membranes 58 which follow one another in the circumferential direction each have a generally trapezoidal shape, with the small side oriented downstream in the direct thrust configuration shown in FIGS. 14 and 15. This generally trapezoidal shape is intended to limit the overlap areas of the membranes in their unfolded configuration within the secondary flow path, and thus to adapt appropriately to the changing diameter of this flow path in the radial direction. However, other shapes are envisaged for these membranes 58, such as an overall rectangular shape leading to larger overlap areas close to an internal diameter of the secondary flow path, when the reverser is in reverse thrust configuration. Specific shapes can also be adopted for the membranes 58 located near the pylon at 12 o'clock and the longitudinal beam at 6 o'clock, so that they adapt to the geometry of these components of the propulsion unit.

Figure 16:
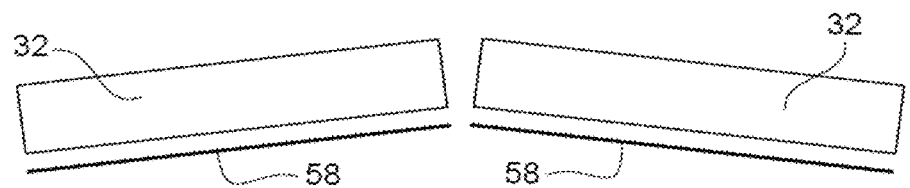
FIG. 16 is a schematic front view of part of the reverser shown in FIG. 14.
Figure 17:
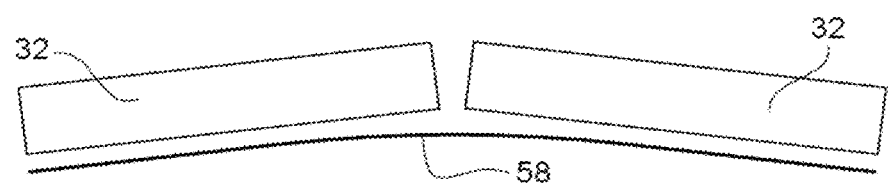
FIG. 17 is a schematic front view similar to that of the preceding figure, according to an alternative embodiment.

In these embodiments with a plurality of membranes 58 associated with each reverser cowl, it is, for example, provided that each membrane 58 extends over a circumferential length identical or similar to that of one of the radially facing vanes 32, as shown schematically in FIG. 16. However, a greater extent can be selected, such as in the example in FIG. 17 where each membrane 58 extends circumferentially along two successive vanes 32.

Figure 18:
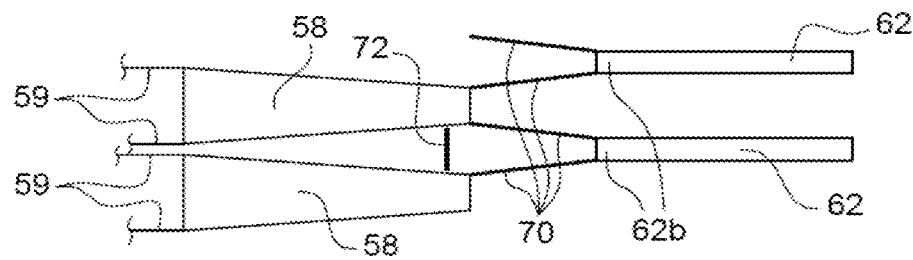
FIG. 18 is a schematic top view of part of the reverser shown in FIG. 14.

FIG. 18 shows that the adjacent membranes 58 can be connected to one another at their radially downstream ends in the configuration shown where the membranes are retracted, these narrowed ends being designed to form the radially inner ends of the membranes 58 in deployed sealing configuration. Cables 72 can be used to mechanically connect them to one another. These cables 72 can connect the radially inner ends of the adjacent membranes 58, but also other parts of these membranes.

Figure 19:
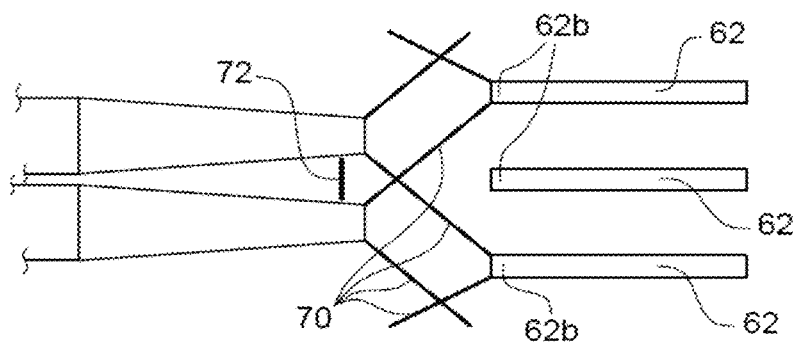
FIG. 19 is a schematic top view similar to that of the preceding figure, according to an alternative embodiment.

The alternative in FIG. 19 shows that the cables 70 of the second attachment means can intersect between the radially downstream ends of the membranes 58 and the second ends 62*b* of the connecting rods 62. Moreover, it should be noted that each connecting rod 62 can help attach several membranes 58, by cooperating, for example, with two cables 70, as shown in the embodiments in FIGS. 18 and 19.

Figure 20:
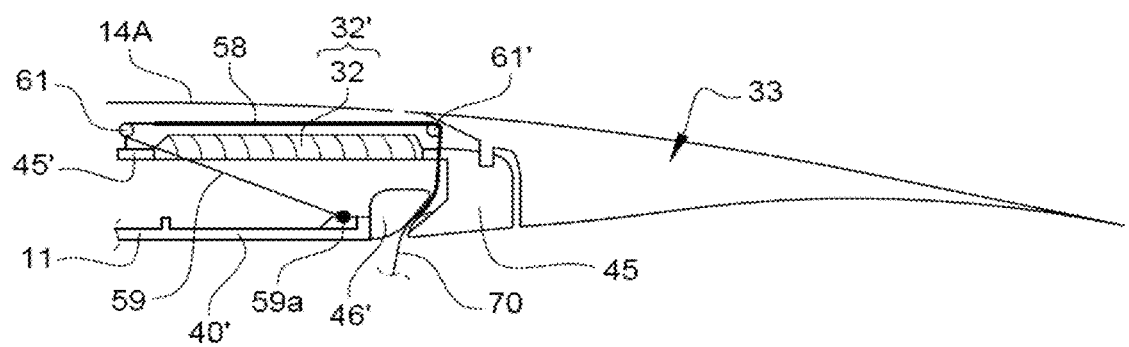
FIG. 20 is a schematic longitudinal sectional half-view similar to that of FIG. 7, according to another preferred embodiment of the invention and with the reverser in the direct thrust configuration.

FIG. 20 shows another preferred embodiment of the invention, which differs from the previous ones in that in the retracted configuration of the membrane(s) 58, they cover the plurality of vanes 32 radially outwards, rather than inwards. In this example, the attachment of the rear ends of the vanes 32 to the rear support structure 45 provides spaces for the membranes 58 to unfold radially inwards.

Figure 21:
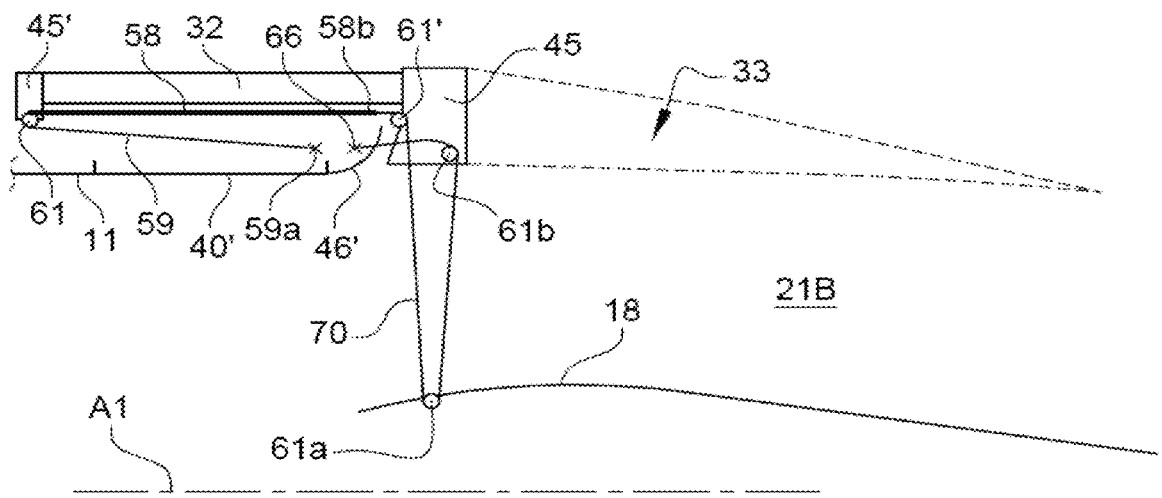
FIG. 21 is a schematic longitudinal sectional half-view similar to that of the preceding figure, according to another preferred embodiment of the invention and with the reverser in the direct thrust configuration.
Figure 22:
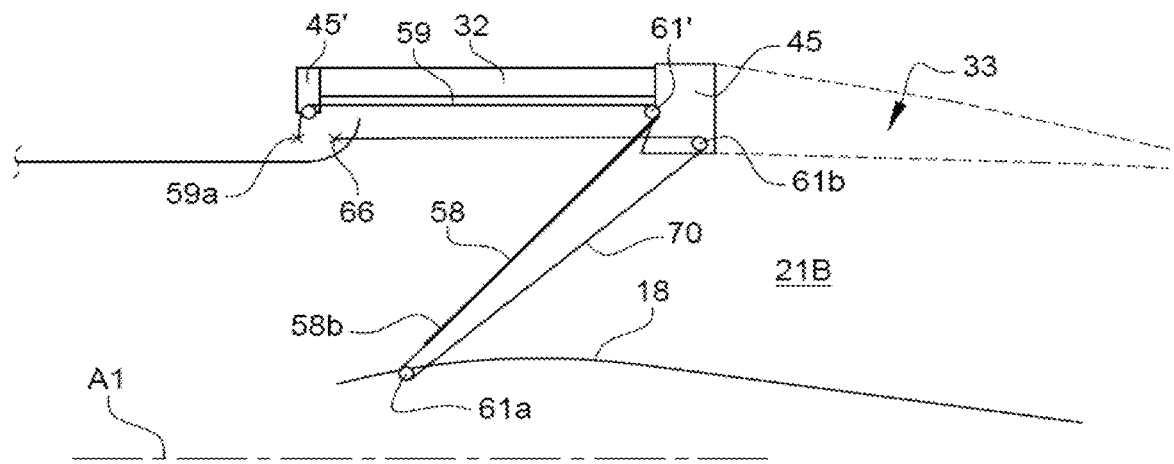
FIG. 22 is a schematic longitudinal sectional half-view similar to that of the preceding figure, with the reverser in the reverse thrust configuration.

In the embodiment shown in FIGS. 21 and 22, the second attachment means comprise the cables 70, but not the connecting rods 62. The second fixing means 66 are no longer located on the radially inner delimiting wall 18 of the secondary flow path 21B, but close to the first fixing means 59*a*, on the outer shell 40' or on the deflection edge 46'. In this way, starting from the second end 58*b* of the membrane 58, the cables 70 wrap around the downstream guiding means 61', then wrap around inner guiding means 61a fixed to the wall 18, after having passed through the secondary flow path 21B. Then, in the downstream direction, the cables 70 are redirected radially outwards in the secondary flow path, to wrap around additional guiding means 61b fixed to the rear support structure 45, before being connected in the upstream direction to the second fixing means 66. The inner and additional guiding means 61a, 61b, which are used to deflect the cables 70 which bypass them, have an identical or similar design to that of the front and rear guiding means 61, 61'. In addition, they also define winding axes parallel to those of all the other aforementioned guiding means.

Figure 23:
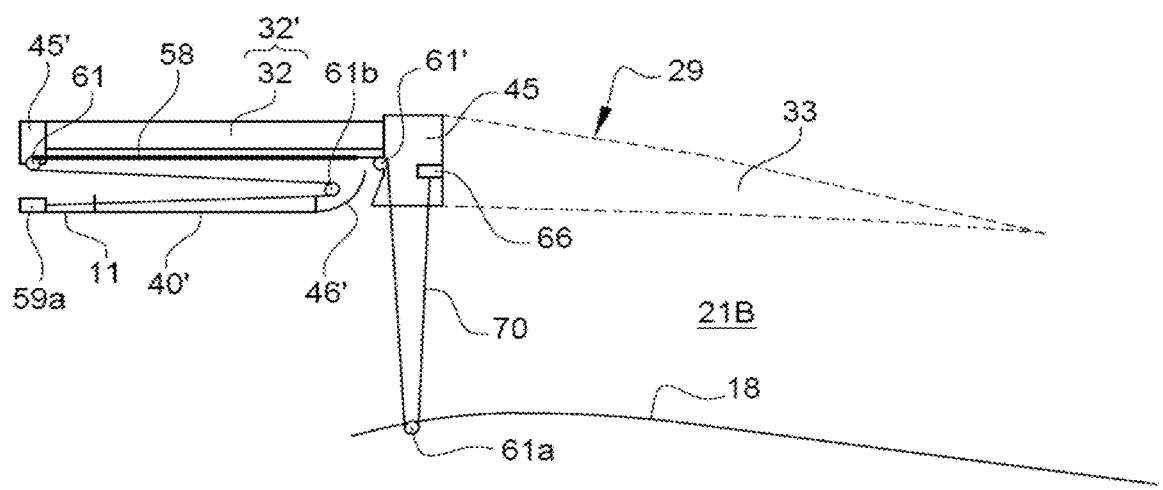
FIG. 23 is a schematic longitudinal sectional half-view similar to that of FIG. 21, according to another preferred embodiment of the invention and with the reverser in the direct thrust configuration.
Figure 24:
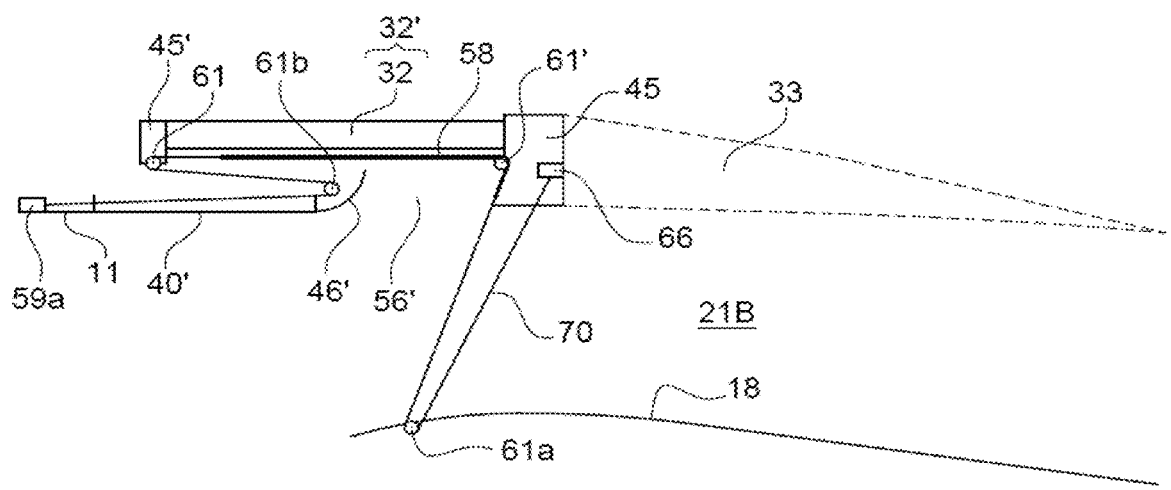
FIG. 24 is a schematic longitudinal sectional half-view similar to that of the preceding figure, with the reverser in an intermediate configuration between the direct thrust configuration and the reverse thrust configuration.

The embodiment shown in FIGS. 23 and 24 is similar to the previous one, except that the additional guiding means 61b are arranged between the first fixing means 59a and the front guiding means 61, in order to guide and redirect the cables 59 upstream. Furthermore, in this embodiment, the first fixing means 59a can be shifted upstream, being fixed to the outer shell 40' or the fan casing. For example, the additional guiding means 61b are fixed to the deflection edge 46' or the outer shell 40', downstream of the first fixing means 59a.

In addition, the second fixing means 66 are fixed to the rear support structure 45, to receive the cables 70 redirected by the inner guiding means 61a. In other words, in this embodiment, the additional guiding means 61b are moved towards the first attachment means and replaced by the second fixing means 66, which are therefore arranged on the movable structure 29 of the reverser.

Various modifications may be made by a person skilled in the art to the invention that has just been described, by way of non-limiting examples only, the scope of which is defined by the appended claims. For example, the thrust reverser 30 can alternatively have a "C-duct" or "O-duct" structure.

The invention claimed is:

1. A thrust reverser for an aircraft propulsion unit, the thrust reverser comprising a fixed structure fitted with a radially inner delimiting wall of a secondary flow path of the propulsion unit intended to be passed through by a secondary flow, the thrust reverser also comprising a movable structure including at least one reverser cowl and at least one assembly of cascade vanes, said at least one assembly of vanes comprising a plurality of cascade vanes as well as a rear vane support structure to which a rear end of the plurality of cascade vanes is attached, and a front vane support structure to which a front end of the plurality of cascade vanes is attached, the movable structure being movable in translation relative to the fixed structure along a central longitudinal axis of the thrust reverser, between a forward direct thrust position and a rearward reverse thrust position, wherein the thrust reverser comprises at least one sealing membrane designed to divert at least part of the secondary flow towards said at least one assembly of cascade vanes, when the movable structure is in the rearward reverse thrust position, the thrust reverser also comprising, associated with said at least one sealing membrane:

first flexible attachment means connecting a first end of the membrane to the fixed structure of the thrust reverser, second attachment means connecting a second end of the membrane, opposite the first end, to the fixed structure or to the movable structure, the second attachment means being fixed to the radially inner delimiting wall of the secondary flow path, or guided by internal guiding means fixed to said same radially inner delimiting wall, the assembly formed by the membrane and the first and second attachment means being guided by front guiding means integral with the front vane support structure, and guided by rear guiding means integral with the rear vane support structure, the thrust reverser being designed such that in the forward direct thrust position of the movable structure, at least part of the sealing membrane extends along the assembly of cascade vanes.

2. The thrust reverser according to claim 1, wherein in the forward direct thrust position of the movable structure, the thrust reverser also being designed such that during at least part of the movement of the movable structure towards the rearward reverse thrust position, said assembly unfolds with the first flexible attachment means bearing on the front guiding means, and with the sealing membrane bearing on the rear guiding means.

3. The thrust reverser according to claim 1, wherein the second attachment means comprise connecting rods, a first end of each of which is mounted on the radially inner delimiting wall of the secondary flow path.

4. The thrust reverser according to claim 3, wherein each connecting rod is designed to move from a position projecting into the secondary flow path, adopted when the movable structure is in its forward direct thrust position, to a position folded back downstream, adopted when the movable structure is in its rearward reverse thrust position, and wherein elastic means push each connecting rod towards its folded back position.

5. The thrust reverser according to claim 1, wherein the front, rear and internal guiding means comprise at least one roller, and/or at least one rotary cylinder, and/or at least one fixed shaft.

6. The thrust reverser according to claim 1, wherein a plurality of the sealing membranes are associated with said plurality of cascade vanes, the membranes following one another in a circumferential direction of the thrust reverser.

7. A nacelle for an aircraft propulsion unit, comprising at least one fan cowl, as well as a thrust reverser according to claim 1.

8. A propulsion unit for an aircraft, comprising a turbomachine and a nacelle according to claim 7.

* * * * *